United States Patent
Freydina et al.

(10) Patent No.: US 10,590,558 B2
(45) Date of Patent: Mar. 17, 2020

(54) NANOSTRUCTURED ALUMINUM ALLOYS FOR IMPROVED HARDNESS

(71) Applicant: Xtalic Corporation, Marlborough, MA (US)

(72) Inventors: Evgeniya Freydina, Acton, MA (US); Joshua Garth Abbott, Westborough, MA (US); Alan C. Lund, Ashland, MA (US); Robert Daniel Hilty, Walpole, MA (US); Shiyun Ruan, Arlington, MA (US); Jason Reese, Londonderry, NH (US); Lisa J. Chan, Boston, MA (US); James A. Wright, Los Gatos, CA (US); James A. Curran, Morgan Hill, CA (US)

(73) Assignee: XTALIC CORPORATION, Marlborough, MA (US)

( * ) Notice: Subject to any disclaimer, the term of this patent is extended or adjusted under 35 U.S.C. 154(b) by 243 days.

(21) Appl. No.: 15/482,678

(22) Filed: Apr. 7, 2017

(65) Prior Publication Data

US 2018/0087173 A1 Mar. 29, 2018

Related U.S. Application Data

(60) Provisional application No. 62/399,300, filed on Sep. 23, 2016.

(51) Int. Cl.
*C25D 5/18* (2006.01)
*C25D 3/44* (2006.01)
(Continued)

(52) U.S. Cl.
CPC .............. *C25D 5/18* (2013.01); *B32B 15/016* (2013.01); *C22C 21/00* (2013.01); *C25D 3/665* (2013.01);
(Continued)

(58) Field of Classification Search
CPC . C25D 11/04; C25D 5/18; C25D 5/48; C25D 7/00; C25D 11/246; C25D 1/00;
(Continued)

(56) References Cited

U.S. PATENT DOCUMENTS

| 4,875,983 A | 10/1989 | Alota et al. |
| 7,608,301 B2 | 10/2009 | Bacos et al. |

(Continued)

FOREIGN PATENT DOCUMENTS

WO 2008/157612 A1 12/2008

OTHER PUBLICATIONS

Tsuda et al., "Electrodeposition of Al—Zr Alloys from Lewis Acidic Aluminum Chloride-1-Ethyl-3-methylimidazolium Chloride Melt", Journal of the Electrochemical Society, 151 (7) C447-C454, May 19, 2004.

(Continued)

*Primary Examiner* — Yan Lan
(74) *Attorney, Agent, or Firm* — Dorsey & Whitney LLP

(57) ABSTRACT

Techniques for forming an enclosure comprised of an aluminum alloy are disclosed. In some embodiments, aluminum ions and metal element ions can be dissolved in a non-aqueous ionic liquid in an electrolytic plating bath. A reverse pulsed electric current can facilitate in co-depositing the aluminum ions and the metal element ions onto a metal substrate. The resulting aluminum alloy layer can include nanocrystalline structures, which can impart the alloy layer with increased hardness and increased resistance to scratching, corrosion, and abrasion. In some embodiments, the metal element ion is chromium and the aluminum alloy layer includes a chromium oxide passivation layer formed via a passivation process. Subsequent to the passivation process, the formation of the chromium oxide layer does not impart a change in color to the aluminum alloy layer. In some (Continued)

embodiments, hafnium ions are co-deposited with aluminum ions to form an aluminum hafnium alloy.

22 Claims, 5 Drawing Sheets

(51) Int. Cl.
    *C22C 21/00*     (2006.01)
    *C25D 11/04*     (2006.01)
    *C25D 7/00*     (2006.01)
    *B32B 15/01*     (2006.01)
    *H05K 5/04*     (2006.01)
    *C25D 5/48*     (2006.01)
    *C25D 3/66*     (2006.01)
    *H04M 1/02*     (2006.01)
    *C25D 1/00*     (2006.01)
    *C25D 11/24*     (2006.01)

(52) U.S. Cl.
    CPC ................ *C25D 5/48* (2013.01); *C25D 7/00* (2013.01); *C25D 11/04* (2013.01); *C25D 1/00* (2013.01); *C25D 11/246* (2013.01); *H04M 1/0283* (2013.01)

(58) Field of Classification Search
    CPC .. C25D 3/04; C25D 3/44; C25D 3/665; B32B 15/016; C22C 21/00; G06F 1/16; H04M 1/0283; H05K 5/04
    See application file for complete search history.

(56) References Cited

U.S. PATENT DOCUMENTS

| | | |
|---|---|---|
| 8,500,986 B1 | 8/2013 | Schuh et al. |
| 8,815,342 B2 | 8/2014 | Menuey et al. |
| 8,821,707 B2 | 9/2014 | Inoue et al. |
| 2006/0290000 A1 | 12/2006 | Worwag et al. |
| 2010/0285322 A1 | 11/2010 | Inoue et al. |
| 2014/0272458 A1 | 9/2014 | Ruan et al. |
| 2015/0322582 A1* | 11/2015 | Freydina ................. C25D 5/44 428/629 |
| 2017/0067179 A1 | 3/2017 | Ul-hamid et al. |
| 2018/0002786 A1* | 1/2018 | Freydina ................. C22C 21/00 |

OTHER PUBLICATIONS

Lou et al., "Electroplating", Encyclopedia of Chemical Processing DOI: 10.1081/E-ECHP-120007747, pp. 1-10, 2006.

Danilov et al., "Electroplating of Wear-Resistant Nanocrystalline Coatings from a Bath Containing Basic Chromium(III) Sulfate (Chrome Tanning Agent)", Protection of Metals and Physical Chemistry of Surfaces, vol. 49, No. 3, Pleiades Publishing Ltd., pp. 299-303, May 23, 2013.

Coffey et al., "Concept Feasibility Report for Electroplating Zirconium onto Uranium Foil", U.S. Department of Energy, PNNL-24106, Mar. 2015, 44 pages.

Wang et al., "Effects of bivalent Co ion on the co-deposition of nickel and nano-diamond particles", Surface & Coating Technology, vol. 191, Mar. 2004, 6 pages.

Archer, "Chrome Plating From Cr(III) in Ionic Liquids—An Industrial Perspective", POETON, IONMET, Feb. 21, 2008, 16 pages.

Bach et al., "Impact of Self Propagating High Temperature Synthesis of Spraying Materials on Coatings based on Aluminium and Metal-Oxides", Thermal Spray 2001: New Surfaces for a New Millenium: Proceedings of the International Thermal Spray Conference, ASM International, May 2001, pp. 497-502.

Endres et al., "Electrodeposition from Ionic Liquids", WILEY-VCH Verlag GmbH & Co. KGaA, Weinheim, 2008, Chapters 3-5 (pp. 47-145) and Chapters 8-10 (pp. 213-283).

\* cited by examiner

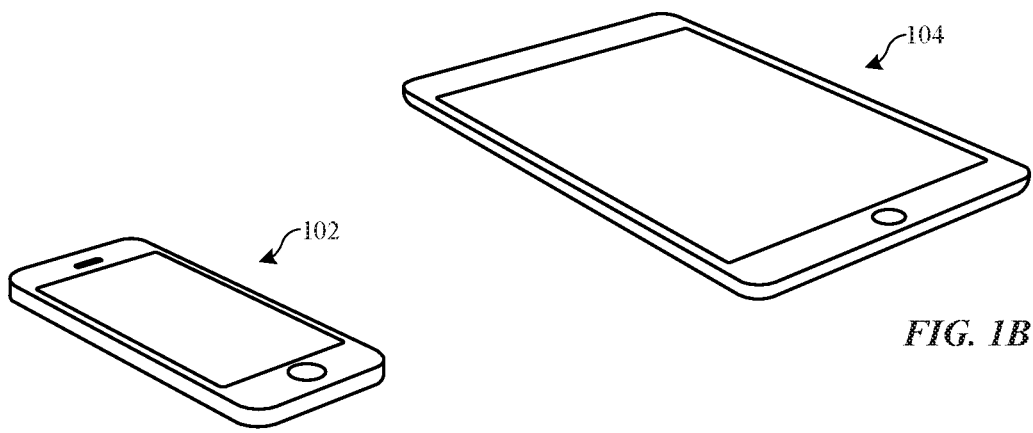
FIG. 1A
FIG. 1B
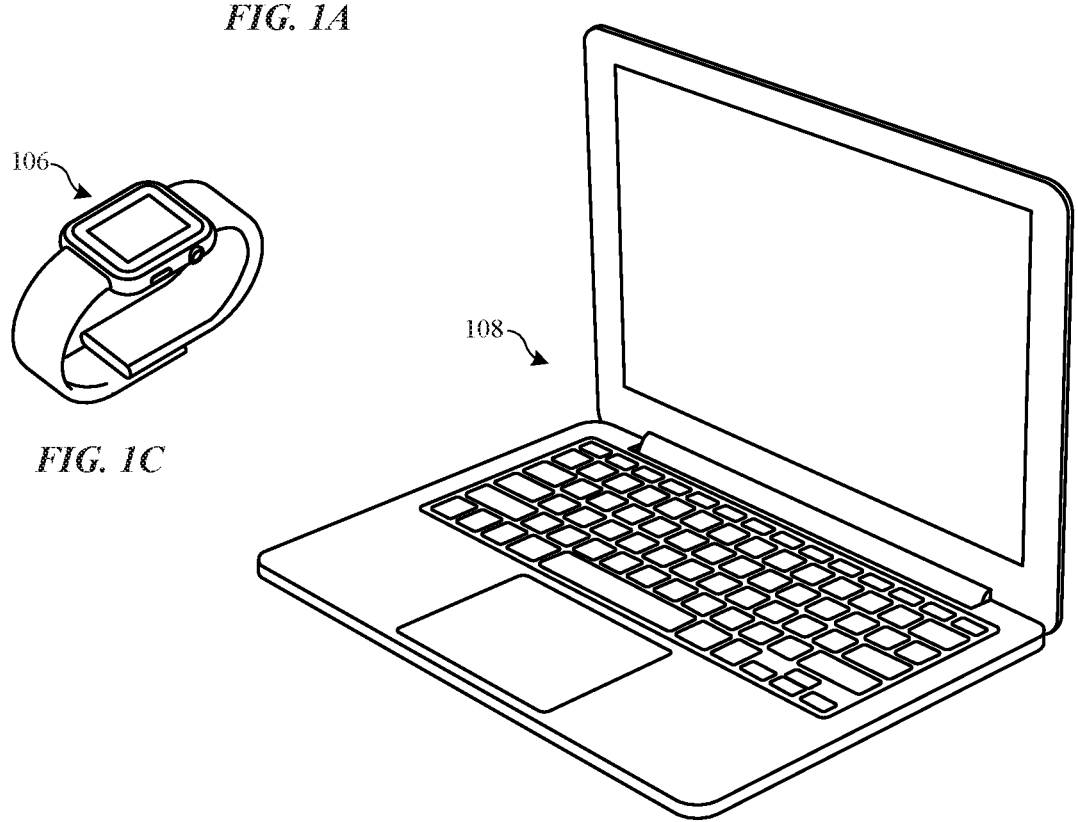
FIG. 1C
FIG. 1D

NANOSTRUCTURED ALUMINUM ALLOYS FOR IMPROVED HARDNESS

CROSS-REFERENCE TO RELATED APPLICATIONS

The present application claims the benefit of U.S. Provisional Application No. 62/399,300, entitled "NANOSTRUCTURED ALUMINUM ALLOYS FOR IMPROVED HARDNESS" filed on Sep. 23, 2016, the contents of which are incorporated by reference in its entirety for all purposes.

This application is related to U.S. patent application Ser. No. 15/482,675, entitled "NANOSTRUCTURED ALUMINUM ZIRCONIUM ALLOYS FOR IMPROVED ANODIZATION", by Evgeniya Freydina et al., filed Apr. 7, 2017, the contents of which are incorporated by reference herein in their entirety for all purposes.

FIELD OF INVENTION

The described embodiments relate to metal alloys and methods for forming aluminum alloys. More specifically, aluminum alloys having nanocrystalline structures for improved hardness and post-anodizing results are described.

BACKGROUND

Metal alloys are a mixture of metals and other materials, such as trace amounts of other types of metals. Pure aluminum is generally soft and is a highly ductile material, which when utilized to form various products, can render the various products susceptible to easily being scratched and damaged during regular usage. Moreover, pure aluminum fails to provide a desirable amount of corrosion protection. Accordingly, there is a need to develop an aluminum alloy having a high degree of mechanical strength and corrosion resistance that can be formed through electroplating and electroforming processes such as to provide a more durable and corrosion resistant metallic surface.

SUMMARY

This paper describes various embodiments that relate to forming aluminum alloys with nanocrystalline structures that increase the hardness of the aluminum alloys. Different types of alloying elements are described, each resulting in aluminum alloys with different mechanical and cosmetic qualities.

According to one embodiment, a technique for forming a consumer electronic product enclosure including an aluminum alloy is described. The method involves electrodepositing the aluminum alloy on a metal substrate by co-depositing aluminum ions and metal ions from a plating bath.

According to another embodiment, an enclosure for a consumer electronic product is described. The enclosure includes an aluminum alloy layer having nanocrystalline structures.

According to another embodiment, a part of a consumer electronic product is described. The part includes a metal substrate and an aluminum alloy layer bonded to the metal substrate. The aluminum alloy layer can include nanocrystalline structures.

According to another embodiment, the aluminum alloy is formed by co-depositing aluminum ions with metal ions in a plating bath. In some embodiments, the metal ions include one of chromium, hafnium, nickel, cobalt, zirconium, or magnesium.

According to another embodiment, an article is described. The article can include an aluminum alloy layer having nanocrystalline structures.

According to another embodiment, an article is described. The article can include a metal substrate and an aluminum alloy layer bonded to the metal substrate, wherein the aluminum alloy layer includes nanocrystalline structures.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The disclosure will be readily understood by the following detailed description in conjunction with the accompanying drawings, wherein like reference numerals designate like structural elements.

FIGS. 1A-1D illustrate perspective views of various products having metallic surfaces that can be manufactured using the aluminum alloys described herein.

Figure 2A:
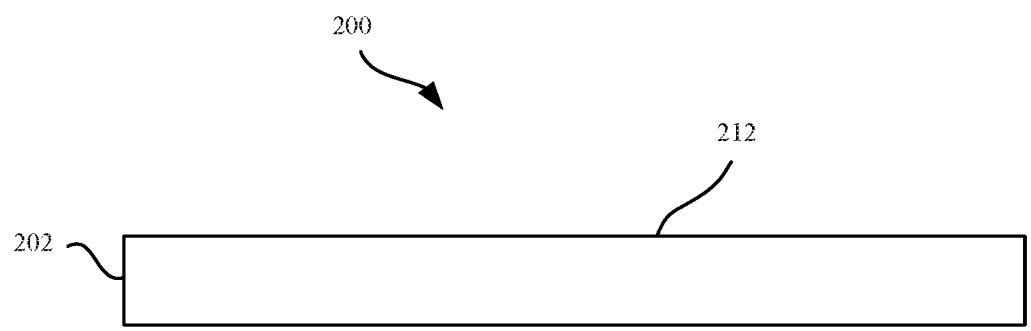
FIGS. 2A-2C illustrate cross sectional views of a metal substrate undergoing a series of steps for forming an aluminum alloy according to some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments of metal alloys and methods for forming metal alloys. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

This application describes aluminum alloys and method for forming aluminum alloys. In particular embodiments, the aluminum alloys are composed primarily of aluminum with alloying elements added in lesser amounts. In some embodiments, the aluminum alloys are composed of aluminum and chromium. In some embodiments, the aluminum alloys are composed of aluminum and hafnium. In some embodiments, the aluminum alloys are composed of aluminum and magnesium. In some embodiments, the aluminum alloys are composed of aluminum and cobalt. In some embodiments, the aluminum alloys are composed of aluminum and nickel. In some embodiments, the aluminum alloys may be composed solely of aluminum and a metal element ion (e.g., Cr, Hf, Mg, Co, and Ni). In some embodiments, the aluminum alloys may be composed of aluminum and a plurality of different types of metal element ions (e.g., Cr and Hf). Methods described herein detail forming nanocrystalline structures in the aluminum alloy layer, which is associated with improved hardness and therefore improved resistance to scratches and dents. Furthermore, methods described herein can improve corrosion-resistance by avoiding coarse iron-based constituent particles present in conventionally-melted aluminum alloys.

One technique for forming an aluminum alloy involves electroplating aluminum ions and alloying element ions onto a metal substrate such that the aluminum ions and alloying element ions are co-deposited onto the metal substrate. In some cases, this technique involves providing the aluminum ions and alloying element ions in a non-aqueous liquid plating bath. Upon applying an electric current to the plating bath, an aluminum alloy layer can be formed as a coating over the metal substrate.

Crystal structures can be formed in the aluminum alloy layer as a result of the electroplating process. The crystal structures can refer to nanocrystalline structures, microcrystalline structures or dual phase amorphous structures. For example, the presence of nanocrystalline structures in an aluminum alloy can impart the aluminum alloy with improved resistance to scratches and abrasion when compared to aluminum alloys that lack nanocrystalline structures. In addition, nanocrystalline structures in the aluminum alloy can impart the aluminum alloy with an increased hardness, while also retaining some deformity such that the aluminum alloy cannot be characterized as being brittle. Furthermore, methods described herein can improve corrosion-resistance by avoiding coarse iron-based constituent particles present in conventionally-melted aluminum alloys.

In addition, the aluminum alloys can be anodized to provide aluminum oxide films having improved cosmetic appearances compared to other types of aluminum alloys. The anodized aluminum alloys are well suited for providing protective and attractive surfaces for various products. For example, methods described herein can be used for providing protective and cosmetically appealing exterior portions of metal enclosures and casings for electronic devices.

As used herein, the terms anodic film, anodized film, anodic layer, anodized layer, anodic oxidized layer, oxide film, oxidized layer, oxide layer, etc. are used interchangeably and can refer to any suitable oxide layer. The oxide layers are formed on metal surfaces of a metal substrate. The metal substrate can be made of any suitable type of metal. As described herein, the term "alloy" refers to a mixture of a metal and another element that are joined through metallic bonds. As described herein, the term "co-deposition" refers to metal ions (e.g., chromium, hafnium, magnesium, nickel, and cobalt) and aluminum ions plated together onto the metal substrate.

The methods described herein can be used to form durable and cosmetically appealing metallic surfaces for consumer electronic products, metal parts, magnets, marine industry components, automotive industry components, aerospace industry components, and the like. FIGS. 1A-1D show exemplary consumer electronic products that can be manufactured using methods described herein. Each of the consumer electronic products shown in FIGS. 1A-1D include housings that are made of metal or have metal sections. FIG. 1A illustrates a portable phone 102. FIG. 1B illustrates a tablet computer 104. FIG. 1C illustrates a smart watch 106. FIG. 1D illustrates a portable computer 108. In some embodiments, the housing includes a base material or substrate, such as a metal substrate (e.g., aluminum or aluminum alloy substrate), with an aluminum alloy formed thereon. In some embodiments, the housing does not include a separate substrate, but rather, are composed primarily of the aluminum alloy. That is, an entire thicknesses of the housing, or entire sections of the housing, can be composed of the aluminum alloy.

Many conventional aluminum alloys can produce discolored and cosmetically unappealing surface finishes once anodized, making them ill-suited for many types of products. This discoloration can be due, in part, to the presence of certain alloying elements, such as copper, when in relatively high concentrations. That is, these alloying elements, which can provide a desired high strength to the aluminum alloy, can be associated with an undesired appearance when anodized. Accordingly, it is difficult to create a strong aluminum alloy having a high scratch and dent resistance while also having an aesthetically pleasing color and appearance, using conventional techniques. Described herein are material processing techniques for providing an aluminum alloy that provides improved dent and scratch resistance, as well as aesthetic qualities suitable for a consumer device, such as the housing of devices 102, 104, 106 and 108.

Figure 2B:
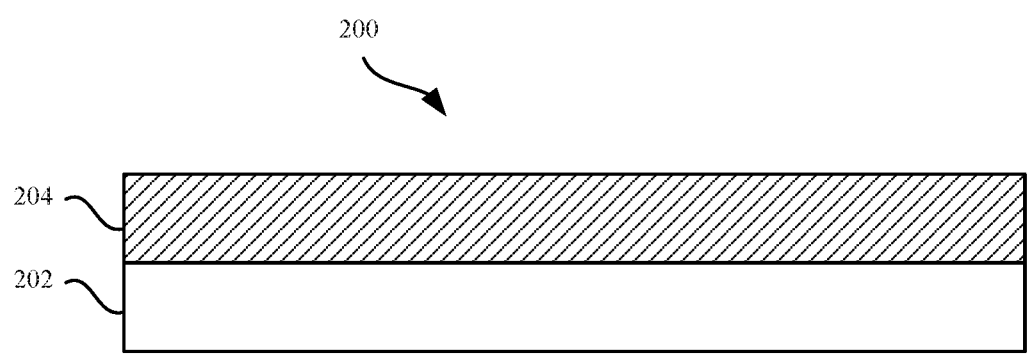
Figure 2C:
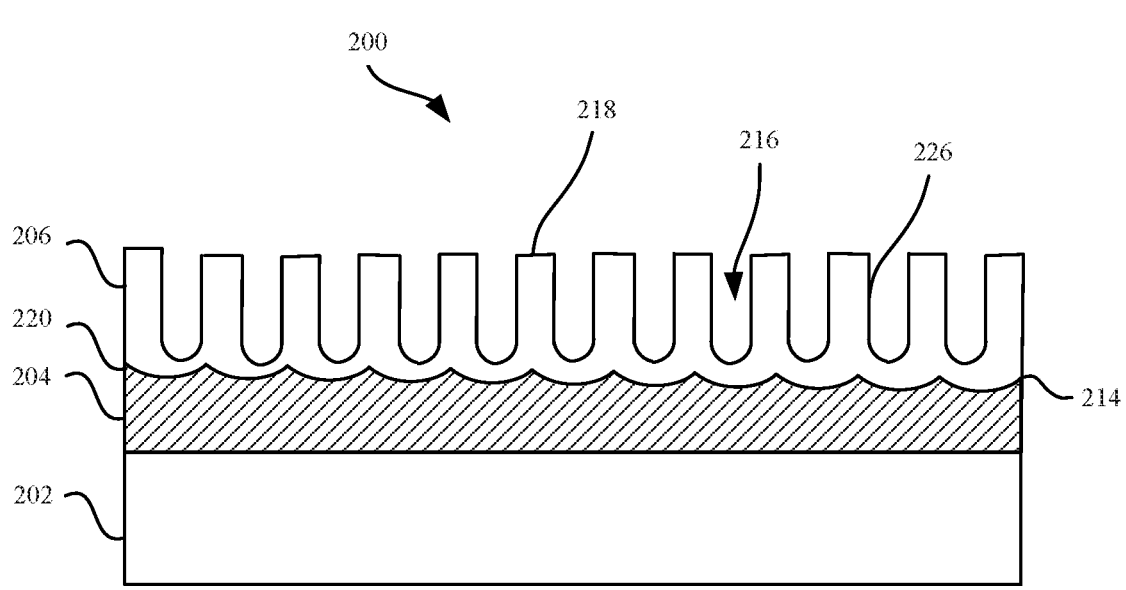

FIGS. 2A-2C illustrate a cross section of a part 200 undergoing a sequence of processing steps for providing an aluminum alloy layer 204, in accordance with some embodiments. The described part 200 can be implemented for forming consumer electronic products, portable devices, general consumer devices, professional devices, magnets, aerospace industry parts, automotive industry parts, marine industry parts, and the like. FIG. 2A illustrates a metal substrate 202 prior to an electrodeposition or electroplating process. The metal substrate 202 can be made of any suitable type of metal. In some embodiments, the metal can include copper, copper alloy, aluminum, aluminum alloy, stainless steel, carbon steel, magnesium, or magnesium alloys. In some embodiments where the metal substrate 202 is an aluminum alloy, the aluminum alloy can include 1000, 2000, 6000 or 7000 series aluminum alloys. For example, the metal substrate 202 can be made from 6063 series aluminum alloy.

The metal substrate 202 can have any suitable thickness suitable for a subsequent electroplating process, whereby a coating is plated or deposited onto an upper surface 212 of the metal substrate 202. In some embodiments, the metal substrate 202 has a near net shape of a final part. For example, the metal substrate 202 can have a near net shape of the housing of the devices 102, 104, 106 and 108.

In some embodiments, the metal substrate 202 can be subjected to a surface treatment prior to the electroplating process. In some embodiments, the surface treatment can be a process that eliminates or minimizes any passivation oxide layer that may be present. In some examples, where the metal substrate 202 is aluminum or an aluminum alloy, exposure to air and/or water can lead to formation of a thin and persistent natural oxide layer. The presence of the oxide layer on the metal substrate 202 can be detrimental to providing a good adhesion to a subsequently electro-plated metal layer because the metal oxide layer can include microscopic fissures which can lead to both premature corrosion of the layer as well as cause the metal oxide layer to become susceptible to chemical dissolution. Furthermore, the presence of the metal oxide layer can lead to delamination of the subsequently electro-plated metal layer from the metal substrate 202. In some embodiments, techniques for providing a surface treatment to the metal substrate 202 can include cleaning (e.g., degreasing) the upper surface 212 of the metal substrate 202 prior to the electroplating process. In some embodiments, the metal substrate 202 layer can also undergo one or more texturing processes, such as one or more of a polishing, etching or blasting processes. Details as to some suitable surface treatment processes will be described in detail below with reference to FIG. 5.

FIG. 2B illustrates an aluminum alloy layer 204 that is deposited onto the metal substrate 202. The thickness of the aluminum alloy layer 204 can vary, depending on design choice and manufacturing limitations. In some embodiments, the aluminum alloy layer 204 has a thickness ranging from between about 1 micrometer to about 200 micrometers. In some embodiments, the aluminum alloy layer 204 can have a thickness ranging between about 1 micrometer to about 1 millimeter, for example, where the aluminum alloy layer 204 is a free-standing, electroformed layer. In some embodiments, the aluminum alloy layer 204 is deposited using an electrodeposition or electroplating process. In some embodiments, the aluminum alloy layer 204 can include primarily aluminum with lesser amounts of a metal element ion (e.g., Cr, Hf, Mg, Co, Ni, etc.). In some embodiments, the aluminum alloy layer 204 can include aluminum and a plurality of different types of metal element ions (e.g., Cr and Hf). In these ways, the metal element ion can be referred to as an alloying element. The combination of two or more different types of metal element ions can provide increased hardness and rigidity to the aluminum alloy layer 204.

In some embodiments, the aluminum alloy layer 204 is a coating that provides structural properties to the metal substrate 202, such as increased hardness, increased rigidity, and increased resistance to deformation and scratches. Moreover, the combination of the alloying element and aluminum provides the metal substrate 202 with an increased hardness and resistance to torsional stress because of the addition of the alloying element. Furthermore, the aluminum alloy layer 204 can provide increased corrosion resistance.

In particular embodiments, aluminum alloy layer 204 is characterized as having nanocrystalline structures that increase the strength of aluminum alloy layer 204 compared to an aluminum alloy layer 204 without such nanocrystalline structures. For example, while it can be possible to form an aluminum alloy layer 204 having only amorphous structures (i.e., lack of nanocrystalline structures), such aluminum alloy layer 204 has significantly reduced strength relative to an aluminum alloy layer 204 with nanocrystalline structures. The term "nanocrystalline structures" can refer to crystalline grain structures having an average size of less than 1 micrometer. The atomic percentage of the alloying element available in the aluminum alloy layer 204 can be associated with the amount of nanocrystalline structures within the aluminum alloy layer 204. In addition, the plating process for plating aluminum alloy layer 204 can also be used to control the quantity of nanocrystalline structures within the aluminum alloy layer 204.

It should be noted, however, that embodiments presented herein are not limited to aluminum alloy layer 204 having nanocrystalline structures. For example, in some embodiments, the aluminum alloy layer 204 includes a combination of dual phase nanocrystalline and amorphous structures. As used herein, the term "amorphous" refers to a non-crystalline structure having no symmetry in the atomic positions. In some embodiments, the aluminum alloy layer 204 only includes amorphous structures (i.e., without substantial presence of nanocrystalline grains).

FIG. 2C illustrates the part 200 after a portion of aluminum alloy layer 204 is converted to an aluminum oxide layer 206. It should be noted that in some embodiments, substantially all of the aluminum alloy layer 204 is converted or consumed by the conversion to an aluminum oxide layer 206. In some embodiments, any suitable type of anodizing process can be used to convert the aluminum alloy layer 204 to the aluminum oxide layer 206.

The aluminum oxide layer 206 can be characterized as having anodic pore structures 216 (or voids) that grow in a perpendicular direction with respect to a top surface 218 of the aluminum oxide layer 206. Additionally, the anodic pore structures 216 can be characterized as being highly ordered (i.e., parallel and evenly spaced relative to each other). The anodic pore structures 216 can be characterized as having sides or walls 226. The anodic pore structures 216 can be formed through consumption of oxygen present at or near the upper surface 214 of the aluminum alloy layer 204. Indeed, unique physical properties of the aluminum oxide layer 206 can be attributed to certain metal element ions (e.g., Cr, Hf, Mg, Co, Ni, etc.) present in the aluminum alloy layer 204, which can impart the aluminum oxide layer 206 with decreased ductility and increased hardness. In contrast, the remaining aluminum alloy layer 204 that is not converted to the aluminum oxide layer 206 via the anodizing process is characterized as being non-porous. In some embodiments, the term "non-porous" can refer to the aluminum alloy layer 204 not being permeable to fluids, such as liquids or gases. In some embodiments, a barrier layer or a transition layer 220 is a thin layer that separates the aluminum alloy layer 204 from the aluminum oxide layer 206. The barrier layer 220 can also be characterized as being non-porous.

In some embodiments, the electroplated aluminum alloy layer 204 can be essentially free of cathodic second-phase particles (e.g., Fe, Si, and/or Ni-rich particles), which are associated with significantly reducing the corrosion resistance of conventional metal alloys. Accordingly, because the electroplated aluminum alloy layer 204 can be essentially free of cathodic second-phase particles, the electroplated aluminum alloy layer 204 can be expected to have increased corrosion resistance due to the lack of cathodic "constituent" particles. The electroplated aluminum alloy layer 204 can be essentially free of cathodic second-phase particles due to the specific electroplating technique described herein.

In some embodiments, the aluminum oxide layer 206 can be formed through a non-electrolytic passivation process. In one example, the aluminum oxide layer 206 can refer to an aluminum chromium oxide layer, which can be formed from an aluminum chromium alloy layer. The aluminum chromium alloy layer can include chromium (III) oxide particles that are dispersed on the upper surface 214 of the aluminum alloy layer 204. During the non-electrolytic passivation process, the aluminum chromium alloy layer can be spontaneously oxidized through exposure to air or water to form a chromium (III) oxide ($Cr_2O_3$) film or coating, in accordance with some embodiments. In some embodiments, the aluminum chromium alloy layer can be oxidized by exposure to an oxidizer, such as dichromate solution.

The aluminum oxide layer 206 can include anodic pore structures 216 which are defined by pore walls 226. In some embodiments, the aluminum oxide layer 206 can be formed via the non-electrolytic passivation process that can impart substantially the same level of hardness and corrosion resistance to the aluminum alloy layer 204 as an electrolytically formed aluminum oxide layer. In some examples, the aluminum oxide layer 206 includes chromium. Scratching the aluminum chromium oxide layer can cause the aluminum chromium oxide layer to spontaneously reform to cover the portion of the aluminum chromium oxide layer that was scratched.

In some embodiments, crystalline structures can be present in the aluminum alloy layer 204 to provide a pathway for oxygen to pass from the aluminum oxide layer 206 to reach non-oxidized portions of the aluminum alloy layer 204.

In some embodiments, the pores 216 can be sealed in a subsequent operation. Sealing the pores 216 of the chromium oxide layer 206 can impart corrosion resistance as well as prevent further growth of chromium oxide on the chromium oxide layer 206

The aluminum oxide layer 206 can provide a hard scratch and dent resistant coating for the part 200. In some embodiments, the aluminum oxide layer 206 can be dyed to impart a desired color to the part 200. For example, a dye or metal colorant can be infused within pores 216 of the aluminum oxide layer 206. It should be noted, however, that this type of coloration is different than the discoloration described above, which is associated with combining certain alloying elements within the aluminum alloy layer 204. In some embodiments, the aluminum oxide layer 206 is not dyed. In some embodiments, it is desirable for aluminum oxide layer 206 to have a substantially transparent or translucent quality. That is, aluminum oxide layer 206 can be at least partially transparent to visible light such that underlying aluminum alloy layer 204 can be visible through aluminum oxide layer 206.

In some embodiments, the scratch and dent resistant properties of the aluminum oxide layer 206 can be directly attributed to the thickness of the aluminum oxide layer 206. In some embodiments, the aluminum oxide layer 206 can be characterized as being an electrical insulator or dielectric. In some examples, anodizing the aluminum alloy layer 204 to form the aluminum oxide layer 206 can result in an external barrier having dielectric properties, which can be beneficial for electrically shielding electrical components (e.g., processor, circuits, etc.) included within portable electronic device enclosures, such as the exemplary devices shown in FIGS. 1A-1D.

Figure 3:
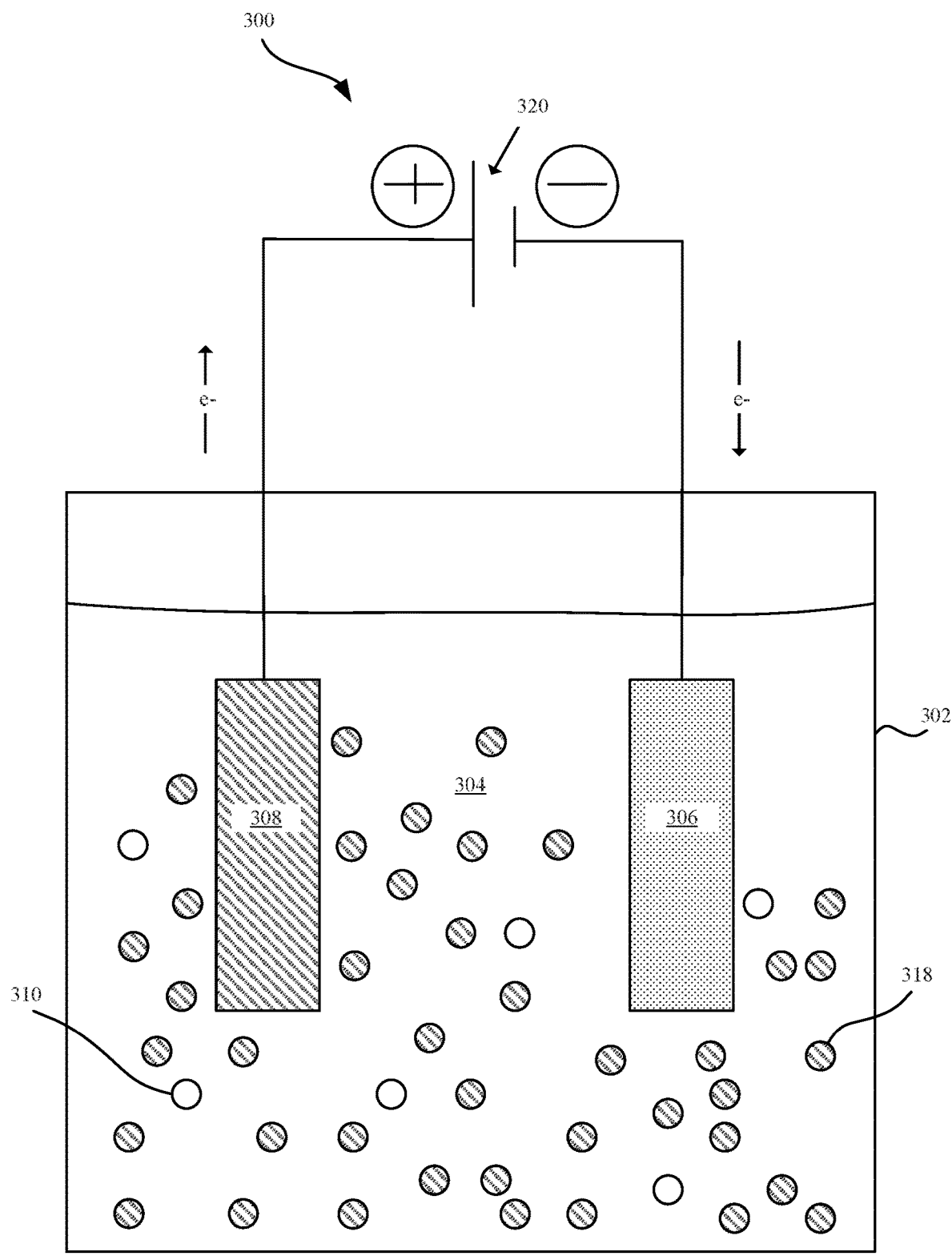
FIG. 3 illustrates an apparatus suitable for forming an aluminum alloy according to some embodiments.

FIG. 3 shows a schematic view of an apparatus 300 suitable for forming an aluminum alloy layer on a metal substrate 306, in accordance with some embodiments. Apparatus 300 includes a tank or container 302 suitable for including an electrolytic bath 304. FIG. 3 shows that the metal substrate 306 is fully immersed or submerged within the electrolytic bath 304, in accordance with some embodiments. In some embodiments, only a portion of the metal substrate 306 is immersed or submerged with the electrolytic bath 304 rendering only the submerged portion of the metal substrate 306 susceptible to forming a metal coating via an electroplating process. During electrodeposition, power supply 320 can supply an anodic electric current to anode 308 (e.g., aluminum substrate) which can oxidize the anode 308 and cause aluminum ions 318 to dissolve into the electrolytic bath 304. The potential across anode 308 and metal substrate 306 (cathode) causes aluminum ions 318 within electrolytic bath 304 to plate onto metal substrate 306. That is, the power supply 320 supplies a current to the anode 308 causing aluminum ions 318 within electrolytic bath 304 to flow towards the metal substrate 306 and deposit as metal onto exposed surfaces of the metal substrate 306. In addition, alloying elements (e.g., Cr, Hf, Mg, Co) are added to electrolytic bath 304 such that alloying element ions 310 are formed in electrolytic bath 304. The alloying element ions 310 can also be attracted to and plated onto metal substrate 306 with aluminum ions 318 (i.e., co-deposited). The resultant aluminum alloy layer 204 plated on the metal substrate 306 can be a mixture of aluminum and the alloying element, with a composition dependent on the concentration of the alloying element ions 310 within the electrolytic bath 304.

In some embodiments, electrolytic bath 304 corresponds to a non-aqueous ionic liquid. Unlike aqueous solutions, non-aqueous ionic liquids are capable of electroplating metals such as aluminum onto a metal substrate because metallic ions are reduced at the cathode instead of the hydrogen ions. Thus, the electrolytic bath 304 that corresponds to a non-aqueous ionic liquid can provide an oxide-free environment such that aluminum ions 318 with alloying element ions 310, can plate onto the metal substrate 306. In some embodiments, the non-aqueous ionic liquid can include one or more co-solvents and/or additives that may influence electric conductivity, viscosity, surface tension of the electrolytic bath 304, and/or diffusion of aluminum ions 318 and/or alloying element ions 310 within electrolytic bath 304.

The presence of water in the plating bath can impart the production of hydrogen. During an electroplating process, hydrogen can cause non-uniform electroplated metal coatings, which can cause the electroplated metal to be brittle and include cracks. In contrast, non-aqueous ionic liquids can produce a negligible amount of hydrogen, and thus can facilitate in forming a continuous and uniform electroplated coating, e.g., without significant cracks or voids.

In some embodiments, the ionic liquid is a mixture of aluminum chloride ($AlCl_3$) and 1-ethyl-3-methylimidazolium chloride (EMIM-Cl), which is capable of transferring an electric current from the aluminum substrate at the anode 308 to the metal substrate 306 at the cathode. In some embodiments, the ratio of $AlCl_3$ relative to EMIM-Cl is between about 1.1:1 to about 2:1. In some embodiments, 1-Ethyl-3-methylimidazolium tetrafluoroborate and 1-Ethyl-3-methylimidazolium trifluoromethylsulfonate can also be used as ionic liquids in the electrolytic bath 304. Process conditions for the electroplating process can vary. In some embodiments, the temperature of the electrolytic bath 304 can be less than 100° Celsius as ionic liquids are generally in a liquid state at room temperature. In some embodiments, the ionic liquids in the electrolytic bath 304 have a temperature between about −20° Celsius to about 250° Celsius. In some embodiments, the electrolytic bath 304 can have an operating range between about 20° Celsius to about 100° Celsius. In some embodiments, the concentration of dissolved alloying element ions 310 in the ionic liquid can vary between about 0.1 g/kg to about 5 g/kg. In some embodiments, the concentration of dissolved alloying element ions 310 in the ionic liquid can vary between about 1 g/kg to about 3 g/kg. In some embodiments, the concentration of dissolved alloying element ions 310 in the ionic liquid can vary between about 1 g/kg to about 2 g/kg.

As described above, the resulting aluminum alloy can include crystalline structures having a grain size of less than one micrometer, which can enhance the strength of the aluminum alloy. Furthermore, tailoring the crystalline grain size within the aluminum alloy can reduce the occurrence of macroscopic defects, such as cracks, in the aluminum alloy. The size and quantity of nanocrystalline grain structures can be controlled, in part, by adjusting relative amounts of alloying element ions 310 dissolved in the electrolytic bath 304. In some embodiments, a high concentration of alloying element ions 310 is associated with smaller nanocrystalline grain sizes. For example, an aluminum alloy layer having an atomic percentage of chromium that is 12% can lead to smaller nanocrystalline grain sizes than a similar aluminum alloy layer having an atomic percentage of chromium that is 1%. In some embodiments, an even higher concentration of alloying element ions 310 can lead to formation of amorphous crystal structures throughout the aluminum alloy. For example, an atomic percentage of chromium in excess of 12% can lead to formation of amorphous crystal structures. However, the increased formation of amorphous crystal structures formed throughout the aluminum alloy layer can further compromise or reduce the strength of the aluminum alloy.

In some embodiments, nanocrystalline structures having a grain size of less than 1 micrometer were found to provide optimal strength to the aluminum alloy. Details regarding the structure of nanocrystalline structures and hardness of aluminum alloys will be described below with reference to FIG. 4.

In some embodiments, the power supply 320 can be electrically coupled to a rectifier (not shown). The rectifier is a device that converts alternating current (AC) to direct current (DC) so that the electric current flows in only a single direction. By using a rectifier, a cathodic electric current can be directed in a single direction towards the metal substrate 306 (i.e., cathode), thereby causing aluminum ions 318 and alloying element ions 310 to plate onto metal substrate 306. In some embodiments, the rectifier is configured to switch the direction of the electric current such that an anodic electric current is directed towards the metal substrate 306, which can cause some of the aluminum and alloying elements that were previously plated on the metal substrate 306 to dissolve as ions back into electrolytic bath 304. Changing the direction of the electric current towards the metal substrate 306 can also facilitate in removing contaminants that were previously plated onto the metal substrate 306. In some embodiments, the anodic electric current density can be of similar magnitude to the cathodic electric current density. Reversing the electric pulse again such that the cathodic electric current is directed towards metal substrate 306 (i.e., cathode) can cause aluminum ions 318 and alloying element ions 310 to redeposit onto the metal substrate 306. Thus, by alternating between an anodic electric current and a cathodic electric current, aluminum and alloying elements can plate onto metal substrate 306 while reducing the plating of contaminants. In addition, this reverse pulse plating can cause leveling of the surface of the metal substrate 306 to provide a more uniform or continuous electroplated layer. In particular, a reverse electric pulsed current can eliminate localized buildup of plated materials even when there is a high concentration of certain ions in the electrolytic bath 304. In addition, reverse pulse plating can facilitate the growth of finer crystalline structures on the electroplated layer, thus promoting formation of nanocrystalline structures, which as described above, can improve the mechanical strength of the aluminum alloy layer 204. In addition, nanocrystalline structures in the aluminum alloy layer 204 can have a high level of electrical conductivity. The high level of electrical conductivity can be beneficial in the manufacture and use of portable electronic device enclosures, such as for establishing a grounding path from the metallic enclosure to a grounding electrode. In contrast, an aluminum alloy layer without nanocrystalline structures can have a low amount of electrical conductivity.

The final thickness of the aluminum alloy layer 204 can vary depending on a desired thickness and on process parameters. In some embodiments, the aluminum alloy layer 204 has a final thickness between about 10 micrometers and about 800 micrometers.

Figure 4:
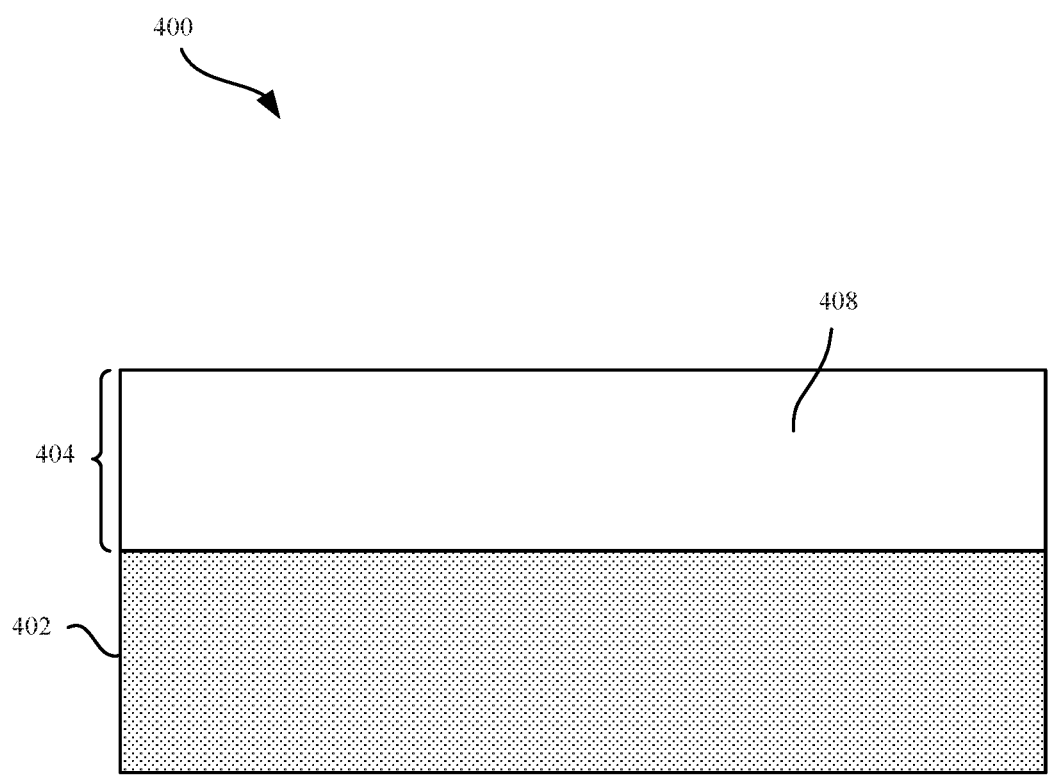
FIG. 4 illustrates a cross sectional view of an aluminum alloy according to some embodiments.

As described above, nanocrystalline grain structures 408 within the aluminum alloy layer 404 can increase the hardness and scratch resistance of the aluminum alloy layer 404. FIG. 4 illustrates a cross section view of a part 400 that includes an aluminum alloy layer 404 with nanocrystalline grain structures 408. Aluminum alloy layer 404 can be plated onto the metal substrate 402 using the techniques described above. In some embodiments, nanocrystalline grain structures 408 refer to grains which can be uniformly distributed throughout the aluminum alloy layer 404. In other words, the nanocrystalline grain structures 408 are uniformly or homogenously distributed throughout the deposit. In some embodiments, the aluminum alloy layer 404 can be entirely comprised of the nanocrystalline grain structures 408 (i.e., without amorphous structures). In some embodiments, nanocrystalline grain structures 408 can have a grain size of less than about 100 nanometers. In some embodiments, the nanocrystalline grain structures have a grain size of less than 1 micrometer.

The nanocrystalline grain structures 408 can constitute a combination of both aluminum and alloying element ions 310 that impart the part 400 with an increased hardness and resistance to scratches, abrasions, and damage. A finer grain size of nanocrystalline grain structures 408 can be associated with a harder and more scratch-resistant aluminum alloy layer 404. In some embodiments, the presence of the alloying element ions 310 at grain boundaries can prevent grain growth and/or recrystallization. Hence, the presence of the alloying element ions 310 can enable a more stable, nano-grain size. In some embodiments, the term "recrystallization" can refer to new, larger grains that are formed at the expense of smaller grains. In some examples, larger grains can grow at the expense of smaller grains through the motion of grain boundaries. Recrystallization of aluminum is generally accompanied by a reduction in strength and hardness and an increase in ductility (ability of a metal to deform under torsional stress) of pure aluminum. The addition of alloying element ions 310 (e.g., chromium) can form nanocrystalline grain structures 408, thereby providing increased hardness compared to pure aluminum. In addition, nanocrystalline grain structures 408 can also prevent cracks or voids from forming within the aluminum alloy layer 404.

The percentage of the metal element ion within aluminum alloy layer 404 can vary; however, certain percentages of alloying element ions 310 can be associated with a reduced grain size of nanocrystalline grain structures 408. In one example, the aluminum chromium alloy layer includes an atomic percentage of chromium between about 0.1 percent to about 12 percent. In another example, aluminum chromium alloy layer includes an atomic percentage of chromium between about 8 percent to about 12 percent. In another example, the aluminum chromium alloy layer includes an atomic percentage of chromium between about 12 percent to about 20 percent. In another example, the aluminum chromium alloy layer includes an atomic percentage of chromium between about 0.1 percent to about 20 percent.

In some embodiments, the aluminum alloy layer 404 can include amorphous or non-crystalline structures. In some embodiments, the aluminum chromium alloy layer 404 may contain both nanocrystalline grain structures 408 and amorphous regions. In some examples, there can be a transition region in the aluminum alloy layer 404 where nanocrystalline grain structures 408 are embedded in an amorphous matrix.

In some embodiments, as the atomic percentage of the alloying element ion 310 increases, the grain size of the nanocrystalline grain structures 408 can be reduced until the grain size is but a few nanometers (e.g., about 3 nanometers to about 5 nanometers). In such instance, the grain size transitions to an amorphous state (i.e., non-crystalline structure). In some examples, an atomic percentage of the alloying element ions 310 in excess of 12 percent can trend towards favoring the formation of amorphous structures over the nanocrystalline grain structures 408. In some embodiments, a combination of dual phase nanocrystalline and amorphous structures can impart the aluminum alloy layer 404 with an increased amount of hardness and scratch resistance relative to an aluminum alloy layer 404 that only includes nanocrystalline grain structures 408. However, the additional presence of amorphous structures can also render the aluminum alloy layer 404 more brittle. In some embodiments, where the aluminum alloy layer 404 includes specific alloying element ions e.g., nickel, the introduction of both nanocrystalline grain structures 408 and amorphous structures can cause a decrease in hardness of the aluminum alloy layer 404.

The thickness of the aluminum alloy layer 404 can be suitable to provide a sufficient barrier to protect the underlying metal substrate layer 202 from damage. In addition, if anodized, the thickness of aluminum alloy layer 404 should be thick enough to provide a sufficiently thick protective aluminum oxide layer 206. For example, for an aluminum oxide layer 206 having a target thickness of about 20 micrometers, the aluminum alloy layer 404 should have a thickness of at least 20 micrometers. It should be noted, however, in some embodiments, the entire thickness or substantially all of the aluminum alloy layer 404 can be intentionally converted to a corresponding aluminum oxide layer 206, and optionally even a portion of metal substrate 402 is also converted to metal oxide (e.g., if metal substrate 402 is aluminum or aluminum alloy). In some embodiments, only a partial portion of the aluminum alloy layer 404 can be intentionally converted to the corresponding aluminum oxide layer 206. For example, a small portion of the aluminum alloy layer 404 can be converted to an aluminum oxide layer 206. In some embodiments, the aluminum alloy layer 404 can have a thickness between about 10 micrometers and about 800 micrometers. In some embodiments, the aluminum alloy layer 404 has a thickness between about 100 micrometers to 300 micrometers.

Figure 5:
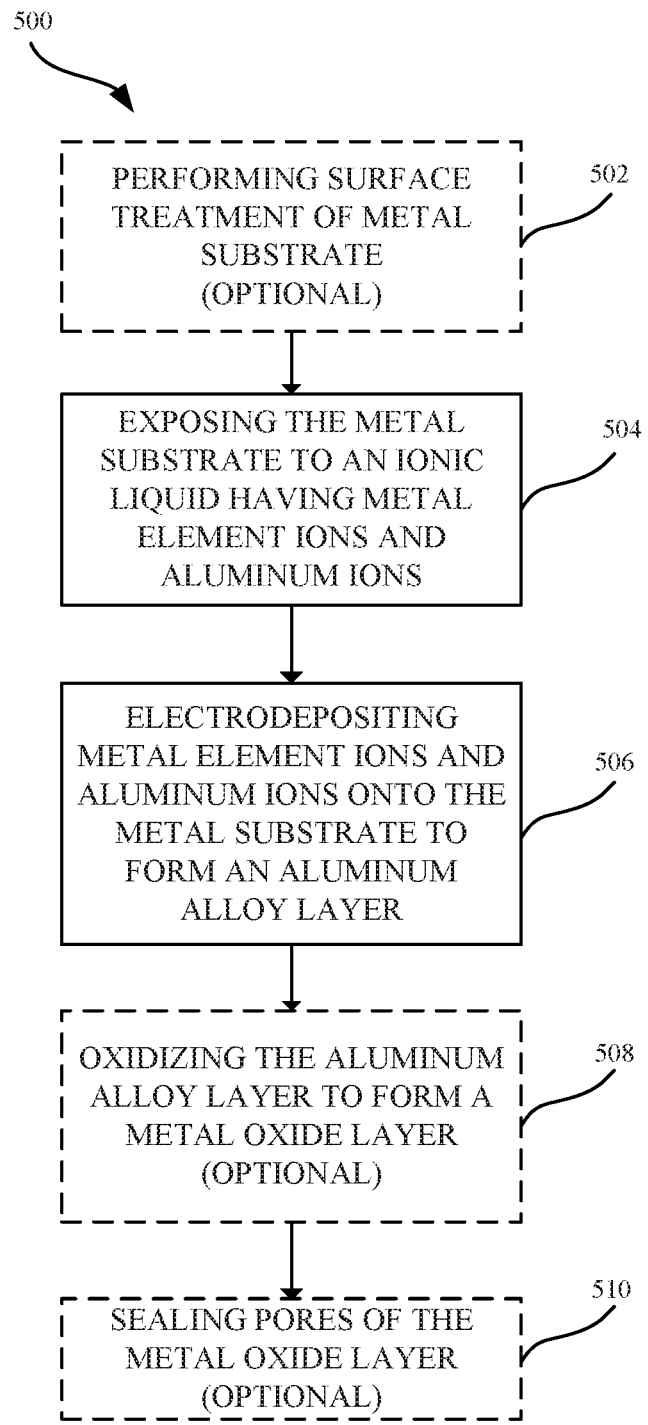
FIG. 5 illustrates a flowchart indicating a process for forming an aluminum alloy according to some embodiments.

FIG. 5 illustrates a process 500 for forming an aluminum alloy layer, in accordance with some embodiments. As shown in FIG. 5, the process 500 can begin at step 502, where a surface of a metal substrate 202 is optionally pretreated. The surface pretreatment can be a process that eliminates or minimizes any oxide layer that may be present on the surface of the metal substrate 202. In some examples, where the metal substrate 202 is aluminum or an aluminum alloy, exposure to air and/or water can lead to forming a thin and persistent natural metal oxide layer. In some embodiments, the metal oxide layer can be removed in order to reveal the metal substrate 202. As a result, the subsequently electrodeposited aluminum alloy layer 404 can be directly bonded to the metal substrate 202. In some embodiments, techniques for providing a surface treatment to the metal substrate 202 can include cleaning (e.g., degreasing) the outer surface of the metal substrate 202 prior to the electroplating process. In some embodiments, the metal substrate 202 may also undergo one or more texturizing processes, such as one or more of a polishing, etching or blasting process. Details as to techniques and methods that may be suitable for removing a metal oxide layer and performing a treatment on the surface of the metal substrate 202 are described in U.S. Patent Application Publication No. 2015/0322582, hereby incorporated by reference in its entirety for all purposes.

At step 504, the metal substrate 202 is exposed to an ionic liquid having aluminum ions and alloying element ions 310. In some embodiments, the ionic liquid is a non-aqueous ionic liquid. In some embodiments, the ionic liquid includes a mixture of aluminum chloride ($AlCl_3$) and 1-Ethyl-3-methylimidazolium chloride (EMIM-Cl). Alloying elements (e.g., Cr, Hf, Co, Ni, and Mg) can be electrochemically dissolved in the ionic liquid to form alloying element ions 310. The ionic liquid can act as both a solvent suitable for providing the alloying element ions 310 in a valence state and as an electrically conductive fluid for the electrolytic process. In some embodiments, the alloying element ions 310 are not dissolved in the ionic liquid until an electric current is applied to the metal substrate 202.

At step 506, aluminum and alloying element ions 310 are co-deposited onto the metal substrate 202 to form the aluminum alloy layer 404. In some embodiments, an electrodeposition process involves applying an anodic electric current to an aluminum anode such that the aluminum is oxidized at the anode to $Al^{+3}$. The resulting aluminum ions $Al^{+3}$ are dissolved into the ionic liquid. The $Al^{+3}$ ions pass through the ionic liquid solution such that aluminum ions are transferred from the anode to the metal substrate at the cathode. At the cathode, the aluminum ions $Al^{+3}$ are reduced by gaining three electrons at the metal substrate 202. The result is the effective transfer of aluminum from the anode to the cathode.

In some embodiments, the aluminum alloy layer 404 includes nanocrystalline grain structures 408. In some embodiments, a combination of nanocrystalline grain structures 408 and amorphous structures are formed in the aluminum alloy layer 404.

In some embodiments, a rectifier is used to convert alternating current (AC) to direct current (DC) so that the electric current flows in only a single direction. The rectifier can also be configured to switch the direction of the anodic and cathodic current flow, which can facilitate in removing contaminants that could otherwise be deposited on the metal substrate 202. Applying a reverse pulse electric current to the plating bath can be also used to dissolve metal ions from the metal substrate 202 and re-deposit the dissolved metal ions onto the metal substrate 202 to form a more uniform or continuous aluminum alloy layer 404. Applying the reverse pulse electric current can favor the formation of nanocrystalline structures within the aluminum alloy layer 404. Moreover, applying the reverse pulse electric current can promote more uniform distribution of nanocrystalline structures within the aluminum alloy layer 404. Additionally, applying a reverse pulse electric current can also remove any roughness in the formed nanocrystalline grain structures 408.

At step 508, the aluminum alloy layer 404 is optionally oxidized to form an aluminum oxide layer 206. Any suitable oxidizing process can be used, such as a suitable anodizing process. In general, anodizing refers to an electrolytic passivation process that converts a portion of the aluminum alloy layer 404 to a corresponding aluminum oxide layer 206. An exemplary apparatus for anodizing the aluminum alloy layer 404 can include a power supply that is electrically coupled to a cathode and anode. The aluminum alloy layer 404 serves as the anode and is immersed within an electrolytic solution. A direct current from the power supply passes to the anode and through the electrolytic solution to the cathode before returning to the power supply to complete the circuit. The oxidation process results in the release of hydrogen at the cathode and oxygen at the aluminum alloy layer 404 to form an aluminum oxide layer 206. In some embodiments, only a partial portion of the aluminum alloy layer 404 can be consumed or converted to an aluminum oxide layer 206. In some embodiments, substantially the entire aluminum alloy layer 404 is being converted to an aluminum oxide layer 206. In some embodiments, a portion of the underlying metal substrate 202 is also converted to a metal oxide (e.g., aluminum oxide).

At step 510, pores of the metal oxide layer can be sealed in a subsequent operation. Sealing the pores of the metal oxide layer can impart corrosion resistance as well as prevent further oxidation of the aluminum alloy layer 404.

Example 1—Aluminum Chromium Alloy

The following table summarizes some processing parameters used in forming samples of aluminum chromium alloys.

| Aluminum Chromium Alloy | |
|---|---|
| Ionic Liquid | EMIMCl/AlCl$_3$/ |
| Valence Electron State | +2 |
| Atomic Percentage (non-oxidized alloy) | 0.1% to 20% |
| Vickers Hardness (non-oxidized alloy) | 160 HV-430 HV |
| b* value (non-oxidized alloy) | 0 |
| Vickers Hardness (passivation oxidized) | 422 HV-487 HV |
| b* value (passivation oxidized alloy) | Close to 0 |
| Vickers Hardness (electrolytic oxidized) | 422 HV-487 HV |
| b* value (electrolytic oxidized alloy) | 10.5 |

Chromium was dissolved in an ionic liquid by preparing chromium (II) chloride in a plating bath.

The aluminum substrate was placed in a plating bath containing chromium (II) chloride. A cathodic current was applied to the plating bath for 5 minutes: 100 mA/cm$^2$, 20 milliseconds pulses with 20 milliseconds intervals between pulses. The aluminum ions and chromium ions were dissolved into the ionic liquid and plated onto an aluminum substrate. In some examples, the aluminum chromium alloy layer only includes aluminum atoms and chromium atoms.

Subsequent to electroplating the aluminum chromium alloy onto the metal substrate, the aluminum chromium alloy samples were tested for hardness according to a Vickers hardness test. The hardness of the aluminum chromium alloy is represented in units of Vickers Pyramid Number (HV). In general, the Vickers hardness test can be used to determine a material's ability to resist deformation when a stress load is applied across a surface area unit of the sample. The various samples of aluminum chromium alloy exhibited a range between about 160 to about 430 HV. The hardness of the aluminum chromium alloy can be directly correlated to the percentage of chromium present. For example, aluminum chromium alloy samples having 12 percent of chromium exhibited greater hardness than aluminum chromium alloy samples having 1 atomic percent of chromium. The various samples of aluminum chromium alloy tested yielded between about 1 percent to about 20 percent of chromium. In addition, nanocrystalline grain structures were observed in samples with between about 1 atomic percent to about 12 atomic percent of chromium, where grain sized nanocrystalline structures were observed in these tested samples. In some examples, the tested samples having between about 1 to about 12 atomic percent of chromium exhibited only nanocrystalline grain structures (i.e., lack of amorphous structures). Additionally, various samples of aluminum chromium alloy having between about 12 atomic percent to about 20 atomic percent of chromium may contain nanocrystalline grain structures and amorphous structures.

Several samples of the aluminum chromium alloy layer were oxidized through a passivation process to form a chromium (III) oxide $Cr_2O_3$ film. The aluminum chromium oxide layer imparted substantial improvements in hardness and scratch resistance compared to an aluminum chromium alloy layer. In some embodiments, the color of the aluminum chromium oxide layer can be adjusted to correspond to a wide range of different colors, e.g., a yellow-gold color. In some embodiments, the color of the aluminum chromium oxide layer can be adjusted by varying the percentage of chromium (III) particles present in the aluminum chromium alloy layer that is subsequently oxidized. In some embodiments, the color of the aluminum chromium oxide layer can be adjusted by varying one or more operational parameters of the oxidization process. The aluminum chromium oxide layer can be characterized as having increased corrosion-resistance relative to the aluminum chromium alloy layer.

Example 2—Aluminum Hafnium Alloy

The following table summarizes some processing parameters used in forming samples of aluminum hafnium alloys.

| Aluminum Hafnium Alloy | |
|---|---|
| Ionic Liquid | EMIMCl/AlCl$_3$/ |
| Valence Electron State | +4 |
| Atomic Percentage oxidized alloy) | 1% to 4.5% |
| Vickers Hardness (non-oxidized alloy) | 100 HV-223 HV |
| b* value (non-oxidized alloy) | 0 |
| b* value (electrolytic oxidized alloy) | 3-16 |

Hafnium was dissolved in an ionic liquid by preparing hafnium chloride (HfCl$_4$) in a plating bath. The aluminum substrate was placed in a plating bath with hafnium chloride (HfCl$_4$). A cathodic pulse current was applied to the plating bath for 5 minutes: 100 mA/cm$^2$, 20 milliseconds pulses with 20 milliseconds intervals between pulses. Aluminum ions and hafnium ions were dissolved into the ionic liquid and plated onto a metal (e.g., aluminum) substrate. In some examples, the aluminum hafnium alloy layer only includes aluminum atoms and hafnium atoms.

Subsequent to electroplating the aluminum hafnium alloy onto the metal substrate, the aluminum hafnium alloy samples were tested for hardness according to a Vickers hardness test. The various samples of aluminum hafnium alloy exhibited a range between about 100 HV to about 223 HV. The hardness of the aluminum hafnium alloy can be directly correlated to the percent of hafnium present. For example, aluminum hafnium samples having 4.5 atomic percent of hafnium exhibited greater hardness than aluminum hafnium samples having 1 atomic percent of hafnium. The various samples of aluminum hafnium alloy yielded between about 1 percent to about 4.5 percent of hafnium. In addition, all of the tested samples included nanocrystalline grain structures 408. Fine grain sized nanocrystalline structures 408 were observed in the samples.

Testing was performed on the aluminum hafnium alloy to measure its b* color-opponent dimension. The various samples of electroplated aluminum hafnium alloy layer yielded a b* value of close to 0. Thus, the electroplated aluminum hafnium alloy layer has a substantially neutral color. Several samples of the aluminum hafnium alloy layer were oxidized through a electrolytic process. The electrolytic hafnium oxide layer of the samples yielded a b* value between about 3 to about 16 which corresponds to a substantially yellow-gold color. Accordingly, oxidizing the aluminum hafnium alloy layer through an electrolytic process yielded increased hardness, but at the expense of forming a yellow-gold color.

Example 3—Aluminum Nickel Alloy

Nickel was dissolved as nickel chloride ($NiCl_2$) in a plating bath. Nickel has a valence electron state of +2. The aluminum substrate was placed in a electrolytic plating bath with nickel chloride ($NiCl_2$). A cathodic pulse current was applied to the plating bath for 5 minutes: 100 $mA/cm^2$, 20 milliseconds pulses with 20 milliseconds intervals between pulses. The aluminum ions and nickel ions were dissolved into the ionic liquid and plated onto an aluminum substrate. In some examples, the aluminum nickel alloy layer only includes aluminum atoms and nickel atoms.

Example 4—Aluminum Cobalt Alloy

Cobalt was used as a metal element ion to form samples of an aluminum cobalt alloy layer. Cobalt was dissolved as cobalt chloride ($CoCl_2$) in a plating bath. Cobalt has a valence electron state of +2. The aluminum substrate was placed in a plating bath with cobalt chloride ($CoCl_2$). A cathodic pulse current was applied to the plating bath for 5 minutes: 100 $mA/cm^2$, 20 milliseconds pulses with 20 milliseconds intervals between pulses. The aluminum ions and cobalt ions were dissolved into the ionic liquid and plated onto an aluminum substrate. In some examples, the aluminum cobalt alloy layer only includes aluminum atoms and cobalt atoms.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A consumer electronic product, comprising:
   an enclosure comprising:
      an aluminum alloy substrate having (i) grain structures having a grain size that is less than or equal to 100 nanometers, and (ii) alloying element ions that include between 0.1 atomic percent to 20 atomic percent of chromium so as to limit recrystallized grain structures to a size less than or equal to 100 nanometers.

2. The consumer electronic product of claim 1, wherein the aluminum alloy substrate has a hardness between 160 HV to 430 HV.

3. The consumer electronic product of claim 1, wherein the aluminum alloy substrate includes nanocrystalline structures have a grain size of less than 1 micrometer.

4. The consumer electronic product of claim 2, wherein the alloying element ions further include between 12 atomic percent to 20 atomic percent of chromium.

5. The consumer electronic product of claim 1, wherein the alloying element ions inhibit recrystallization of grain structures having a grain size greater than 100 nanometers.

6. The consumer electronic product of claim 1, wherein the enclosure further comprises an anodic oxide layer overlaying the aluminum alloy substrate.

7. The consumer electronic product of claim 1, wherein the alloying element ions include a first alloying element ion and a second alloying element ion that is different from the first alloying element ion.

8. A consumer electronic product, comprising:
   a metal substrate; and
   an aluminum alloy layer bonded to the metal substrate, wherein the aluminum alloy layer includes (i) alloying element ions having between 1 atomic percent to 4.5 atomic percent of hafnium, and (ii) nanocrystalline structures having a grain size less than 100 nanometers.

9. The consumer electronic product of claim 8, wherein the alloying element ions inhibit growth of nanocrystalline structures having a grain size greater than 100 nanometers.

10. The consumer electronic product of claim 8, wherein the aluminum alloy layer has a b* color dimension value between 3 to 16.

11. The consumer electronic product of claim 8, wherein the nanocrystalline structures are uniformly distributed throughout the aluminum alloy layer.

12. The consumer electronic product of claim 11, wherein the aluminum alloy layer has a hardness between 100 HV to 223 HV.

13. An article of manufacture, comprising:
   an aluminum alloy substrate having (i) grain structures having a grain size less than or equal to 100 nanometers, and (ii) alloying element ions that include between 1 atomic percent to 4.5 atomic percent of hafnium so as to limit recrystallized grain structures having a size less than or equal to 100 nanometers.

14. An article of manufacture, comprising:
   a metal substrate; and
   an aluminum alloy layer bonded to the metal substrate, wherein the aluminum alloy layer includes (i) alloying element ions having between 0.1 atomic percent to 20 atomic percent of chromium, and (ii) nanocrystalline structures having a grain size less than 100 nanometers.

15. A method of forming a consumer electronic product enclosure including a metal substrate, the method comprising:
   electrodepositing an aluminum alloy layer on the metal substrate by co-depositing aluminum ions and alloying element ions by using a plating bath, wherein the aluminum alloy layer includes either 0.1 atomic percent to 20 atomic percent of chromium or 1 atomic percent to 4.5 atomic percent of hafnium.

16. The method of claim 15, wherein the plating bath includes a non-aqueous ionic liquid.

17. The method of claim 15, wherein co-depositing the aluminum ions and the alloying element ions comprises:
   applying an anodic pulse current to the metal substrate to dissolve the alloying element ions formed on the metal substrate; and applying a cathodic pulse current to the metal substrate to re-deposit the dissolved alloying element ions onto the metal substrate.

18. The method of claim 15, wherein the aluminum alloy layer includes nanocrystalline structures having a grain size of less than 1 micrometer.

19. The method of claim 15, wherein the aluminum alloy layer has grain structures having a grain size of less than or equal to 100 nanometers.

20. The method of claim 15, wherein the aluminum alloy layer has a hardness between 160 HV to 430 HV.

21. The method of claim 15, further comprising:
oxidizing at least a portion of the aluminum alloy layer to form an aluminum oxide layer.

22. The method of claim 15, wherein the alloying element ions include a first type of alloying element ion and a second type of alloying element ion that is different from the first type of alloying element ion.

* * * * *